United States Patent [19]
Parker

[11] Patent Number: 5,735,172
[45] Date of Patent: Apr. 7, 1998

[54] SWASHPLATE MACHINE

[76] Inventor: Alfred Parker, 46 Byron Ave., Takapuna, Auckland, New Zealand

[21] Appl. No.: 637,665
[22] PCT Filed: Oct. 28, 1994
[86] PCT No.: PCT/NZ94/00121
    § 371 Date: May 24, 1996
    § 102(e) Date: May 24, 1996
[87] PCT Pub. No.: WO95/12054
    PCT Pub. Date: May 4, 1995

[30] Foreign Application Priority Data

Oct. 28, 1993 [NZ] New Zealand .................... 250094

[51] Int. Cl.$^6$ .................... F01C 9/00; F04C 9/00; F16H 23/00
[52] U.S. Cl. .................... 74/60; 92/71; 417/269; 418/53
[58] Field of Search .................... 74/60; 92/71; 417/269; 418/53

[56] References Cited

U.S. PATENT DOCUMENTS

| | | | |
|---|---|---|---|
| 3,942,384 | 3/1976 | Parker | 74/60 |
| 3,946,617 | 3/1976 | Moriarty | 74/60 |
| 3,982,860 | 9/1976 | Sraebler | 418/53 |
| 4,008,987 | 2/1977 | Ritchie | 418/53 |
| 4,125,030 | 11/1978 | Hackett | 74/60 |
| 5,242,281 | 9/1993 | Hartley et al. | 418/53 |

FOREIGN PATENT DOCUMENTS 233133  9/1959  Australia.

Primary Examiner—Rodney H. Bonck
Assistant Examiner—Troy Grabow
Attorney, Agent, or Firm—Brown, Martin, Haller & McClain, LLP

[57] ABSTRACT

A swashplate machine comprises a casing (1) provided with end members (2, 3) and a rotatable shaft (4). The shaft (4) drives a swashplate (5) through an interconnecting member (6) comprising an off-set sleeve (7) that is keyed to the shaft (4) and a non-rotating ball portion (8). The interconnecting member (6) is further supported by a pair of end cones (15). A baffle (9) fixed to the casing (1) intersects the swashplate (5) and an oscillatable pivotable slotted member is provided at the intersection. The arrangement of the swashplate machine being such that at least one of the end cones (15) is slidably mounted in the casing (1) on a guide (18) such that during operation of the swashplate machine limited axial movement of at least the one cone (15) is possible whilst rotational movement of the cone (15) is prevented by the guide (18).

7 Claims, 5 Drawing Sheets

SWASHPLATE MACHINE

BACKGROUND ART

It is an object of the present invention to provide a swashplate machine which addresses the above desirata.

In my U.S. Pat. No. 3,942,384 I describe a swashplate machine comprising a housing, a shaft supported by the housing, the shaft mounting a reciprocating ball mounted swashplate via an angularly off-set journal arrangement such that rotation of the shaft will cause reciprocation of the swashplate within a defined chamber(s). The swashplate chamber is divided by a baffle.

There have been a number of aspects of the machine described in U.S. Pat. No. 3,942,384 which I have discovered could be improved, namely:

a) The means for locating the ball mounted swashplate.

b) The means for supporting the baffle in the assembly.

c) Lubrication.

The object of the present invention is to address the above-mentioned aspects which I have found substantially improve the serviceability and efficiency of the machines.

DISCLOSURE OF INVENTION

According to the present invention there is provided a swashplate machine comprising a casing having end assemblies, a pair of end cones each having opposed semi-spherical surfaces and defining with the casing a ball assembly and swashplate chamber, an axle journalled with respect to the casing supporting a ball assembly and a swashplate which occupy the swashplate chamber, a baffle located with respect to the casing which intersects and divides the swashplate chamber, wherein at least one of said cones is slidably mounted in the casing on a guide, the arrangement being such that during operation of the machine limited axial movement of said at least one cone is possible whilst rotational movement of the cone is prevented by said guide.

The said at least one end cone can have sealing means between its outer surface and the casing.

The guide can be provided by pins.

The pins can be fixed to said at least one end cone and slide in an apertures in the adjacent end assembly.

Biasing means can be provided between said at least one moveable end cone and its adjacent end assembly.

According to a further aspect of the present invention there is provided a swashplate machine comprising a casing having end assemblies, a pair of end cones each having opposed semi-spherical surfaces and defining with the casing a ball assembly and swashplate chamber, an axle journalled with respect to the casing and supporting a ball assembly and a swashplate which occupy the swashplate chamber, an oscillatable bifurcated pivot between said ball assembly and said swashplate, said pivot having a longitudinal slot between the two bifurcations thereof connected to each other by a root mounted to said ball assembly, and said swashplate fitting in the slot of said pivot.

The outer ends of the bifurcations can be semi-spherical and engage a semi-spherical inner surface of said casing and there being a rubbing sealing member on an inner part of said oscillatable pivot, the sealing member conforming to the spherical surface of said spherical ball.

The sealing member can be biased outwardly by a spring.

The root of said bifurcated member can be provided with a radiused surface.

According to yet a further aspect of the present invention there is provided a swashplate machine comprising a casing having end assemblies, a pair of end cones each having opposed semi-spherical surfaces and defining with the casing a ball assembly and swashplate chamber, an axle journalled with respect to the casing and carrying a ball assembly and swashplate which occupy the swashplate chamber, said shaft having at least one passageway therein, said passageway being open to a bearing at one end and open externally of said casing at the other end, and a non-return valve provided in said passageway, the construction and arrangement being such that said non-return valve allows a lubricant provided in said passageway to pass through said passageway in a direction from the end open externally of said casing toward the end open to said bearing only.

The lubricant can be provided in a reservoir located externally of said casing, said reservoir having a lubricant outlet which is open to the end of said passageway open externally of said casing.

This invention may also be said broadly to consist in the parts, elements and features referred to or indicated in the specification of the application, individually or collectively, and any or all combinations of any two or more of said parts, elements or features, and where specific integers are mentioned herein which have known equivalents in the art to which this invention relates, such known equivalents are deemed to be incorporated herein as if individually set forth.

The invention consists in the foregoing and also envisages constructions of which the following give examples.

BRIEF DESCRIPTION OF DRAWINGS

One preferred form of the invention will now be described with reference to the accompanying drawings in which.

BEST MODES FOR CARRYING OUT THE INVENTION

Figure 1:
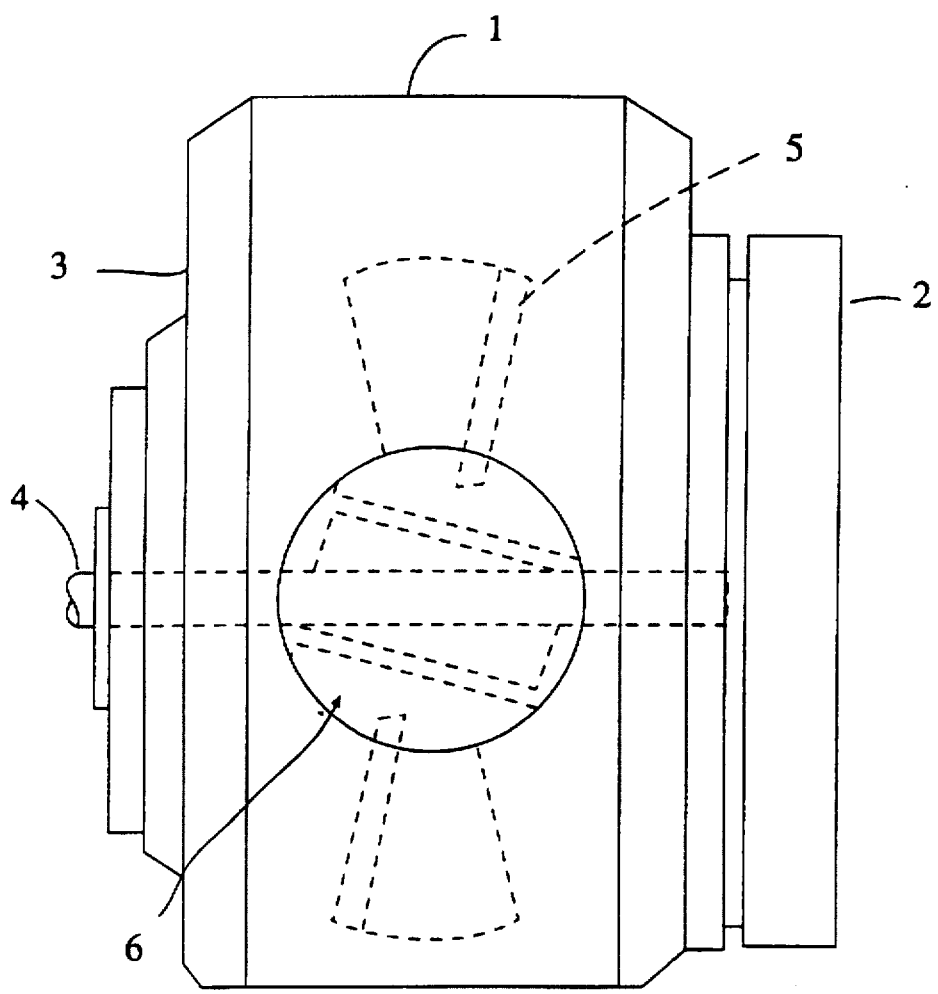
FIG. 1: is a side view of a swashplate machine constructed according to the invention with some internal details shown by broken lines.

Referring to the drawings, a swashplate machine is constructed comprising a casing 1 provided with end members 2 and 3 and a shaft 4 rotates in the end member 3. The shaft 4 drives a swashplate 5 through an interconnecting member 6 generally indicated by arrow 6. The interconnecting member 6 can comprise an off-set sleeve 7 which is keyed or otherwise fixed to shaft 4 and which supports a non-rotating ball portion 8 to which swashplate 5 is mounted. Roller bearings (not shown) can be provided between one sleeve 7 and ball portion 8.

A baffle 9 is provided fixed in slots 10 in the casing 1 and the undersurface of the baffle 9 is semi-spherical as is the inner wall of the casing 1. The baffle 9 intersects swashplate 5 and an oscillatable pivotable slotted member 10 is provided at the intersection. The construction of the baffle 9 and the pivotable slotted member 10 is described in more detail below.

The end member 2 is part of an end assembly which includes an end plate 11 (FIG. 2) and an end bell 12 in which an eccentric 13 is mounted.

The casing 1 has a hollow cylindrical wall 14 and an end cone 15 has a cylindrical surface 16 which slides on the wall 14 being sealed by O-rings 30.

A plurality, for example, four guides in the form of pins 18 are mounted in the end bell 12. The guide pins 18 are preferably a tight press fit or are otherwise fixed in the end cone 15 and slide in apertures 19 in the end bell 12. However the guide pins may be fixed in the end bell 12 and slide in the end cone 15. The apertures 19 are blind holes or have plugs 20. Thus the end cone 15 is fixed against rotational movement but may have some axial movement by sliding of the pins 18 in the holes 19. Accordingly the material of the pins and of the apertures in which they fit should be of dissimilar metal e.g. stainless steel on aluminium or stainless steel on brass or steel on cast iron or some other dissimilar metal combination which is known to have good low frictional and wearing qualities. Some lubrication may be provided for example by using a grease fitting, the grease having a molybdenum di sulphide additive or otherwise as desired.

In use there is usually some pressure between the end bell 12 and the end cone 15 which is sufficient to maintain the curved surface of the end cone 15 against the ball portion 8. However if desired some form of spring arrangement may be provided to maintain some pressure between the end bell 12 and the cone member 15 and for example short compression springs (not shown) may be provided around e.g. two of the pins 18.

With present swashplates machines if a moving cone is allowed to be guided by a centre spigot an outer case erosion of the mating surface becomes apparent after some considerable number of hours of use. Although there is no deterioration in performance of the machine such erosion is undesirable. I believe that the cause of this erosion is the rubbing of two alloy surfaces together which evolves aluminium oxide and the oxide gradually wears patterns of U-formation such a shape being due to the slight directional movement of the cone acting under the influence of the rotating line contact between the swashplate and the cone. The present invention has been devised to overcome or at least go some distance towards limiting the problem. The or each moving cone is fitted with the guiding pins or columns which are located in the end bell. These pins or columns are made of a material to satisfy continued tightness in one element and a sliding fit in the other and as stated possible materials are stainless steel or stainless iron, brass, bronze, hard PTFE. It is preferable that there is a high co-efficient of expansion, good strength and ability to remain tight in one element yet maintain a satisfactory sliding bearing in the other.

The shaft 4 is provided with a central passageway 21 and a further passageway 22 is provided between passageway 21 and the bearing between spherical member 8 and the shaft 4. The passageway 21 exits the shaft at the end of the shaft adjacent to the end 2 of the machine casing. Access to passageway 21 is provided by hollow pin 23 which is inserted into passageway 21 by e.g. a tight press fit or screw thread. The pin 23 retains a ball 24 at the innermost end thereof which ball is held firmly against the innermost end of pin 23 by a biasing means comprising a spring 25. In use I have found that a passageway such as passageway 21 may be used to convey a lubricant. However, due to the action of the swashplate I have found that in any chamber of the machine at any time there is either a pressure or a vacuum relative to atmosphere pressure. This vacuum or pressure hinders effective lubrication since the lubricant is simply forced back and forth within passageways 21 and 22. I have found that lubrication is much more effective when a non-return valve such as ball 24 and spring 25 is provided in passageway 66. When a vacuum is present within the appropriate chamber the lubricant forces the ball out of contact with pin 23 against the force provided by spring 25 and lubricant flows into the bearing. When the vacuum is not present ball 24 seals the passageway through pin 23 so that lubricant does not leave the machine. Thus lubricant does not need to be supplied to the machine under pressure or by a separate pump. When the machine is running oil from passage 22 is subject to centrifugal forces providing pressure to distribute oil to all the necessary surfaces.

Figure 2:
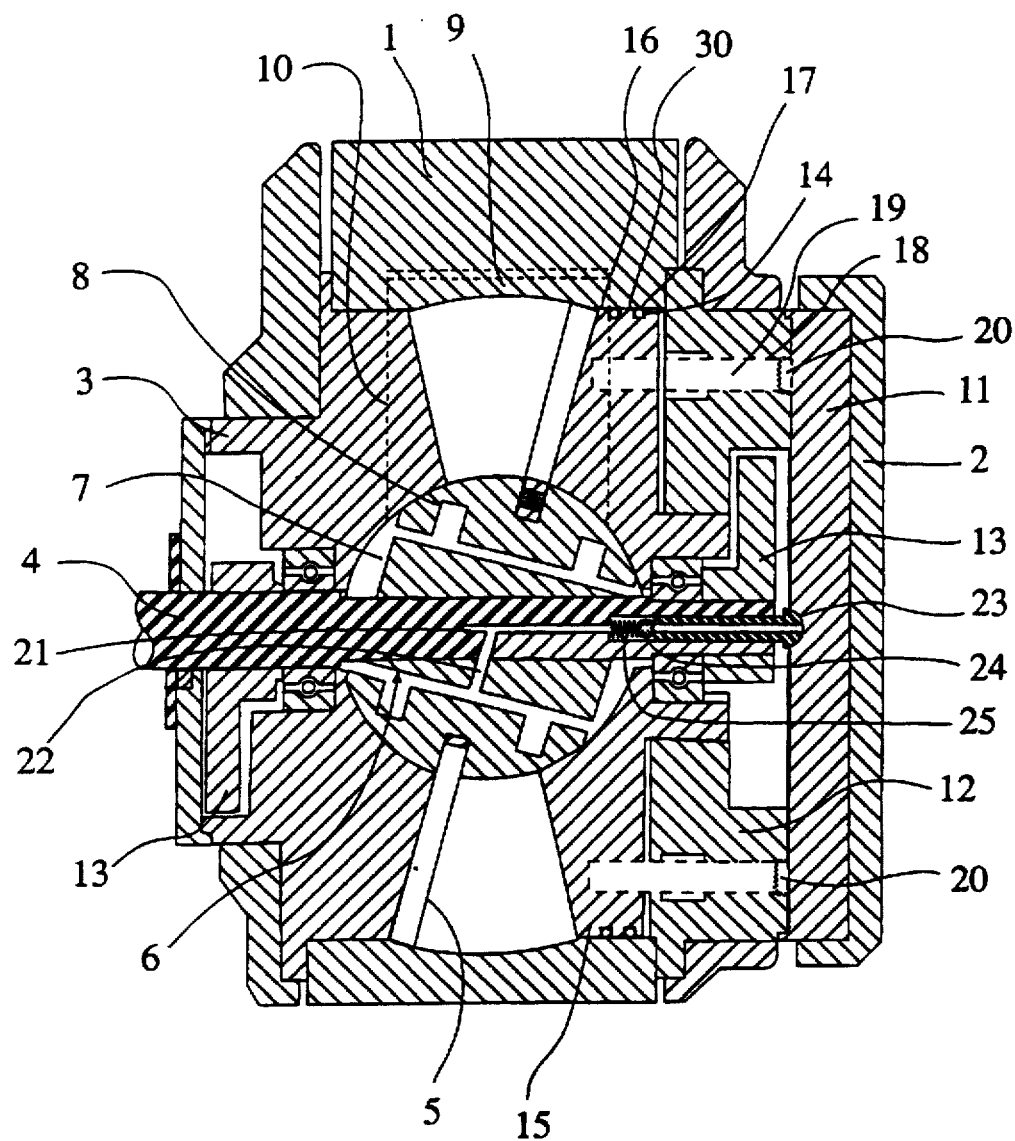
FIG. 2: is a cross-section of a swashplate machine of FIG. 1, and FIG. 3: is a diagrammatic perspective view of the swashplate, baffle and axle assembly for the machine of FIG. 1, and FIG. 4: is a elevation in part cross-section of part of the swashplate machine of FIG. 1, showing the interconnecting member and baffle for the machine of FIG. 1 in more detail.
Figure 3:
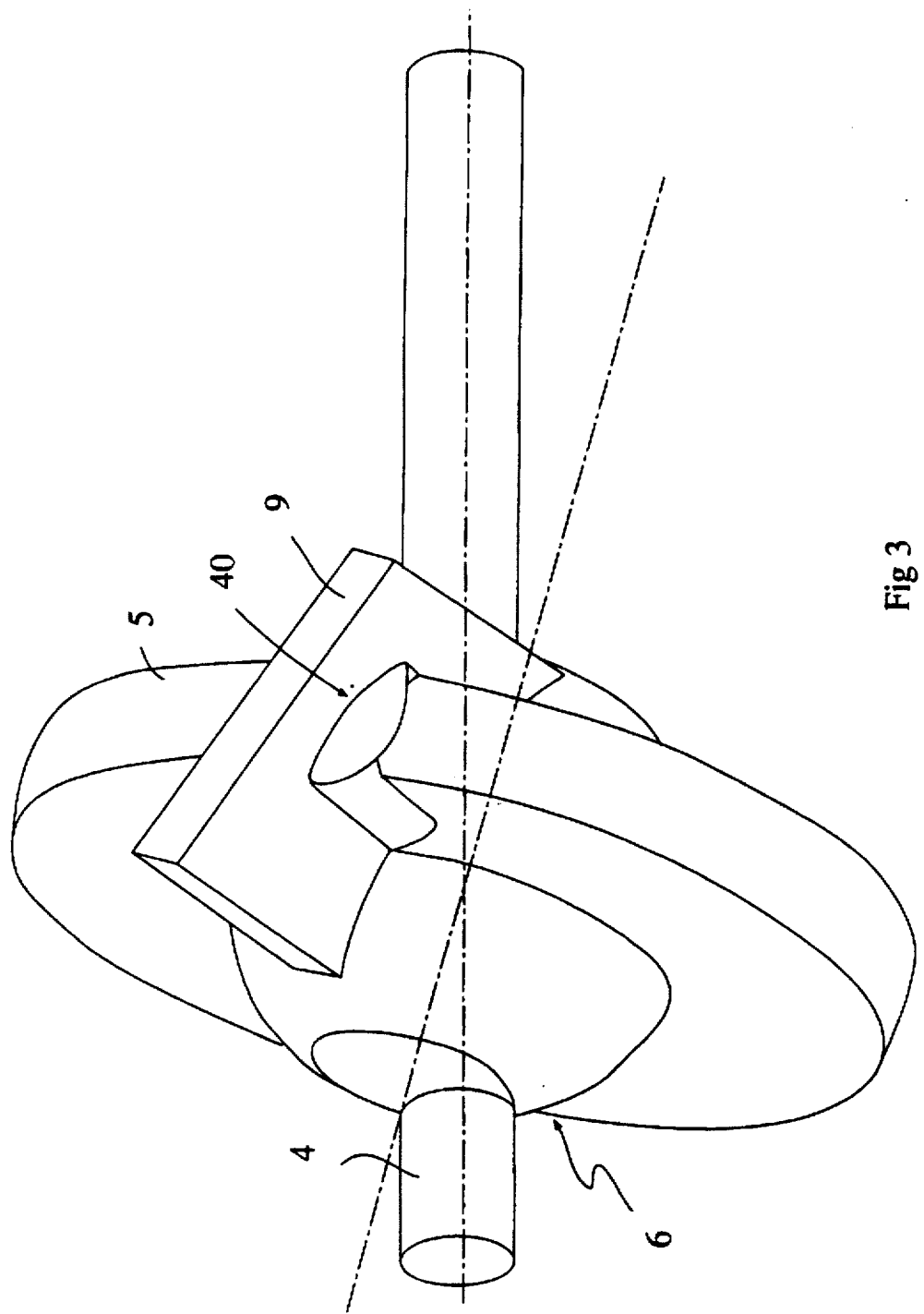
Figure 4:
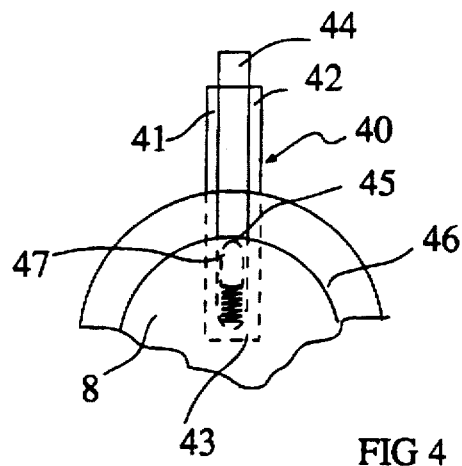
Figure 5:
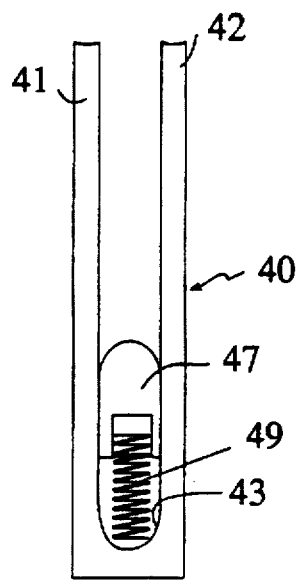
FIGS. 5 and 5a: are elevations of a slotted member of the apparatus of FIG. 1, and FIG. 6: is a part sectional view of an outlet port detailed for the machine of FIG. 1.
Figure 5A:
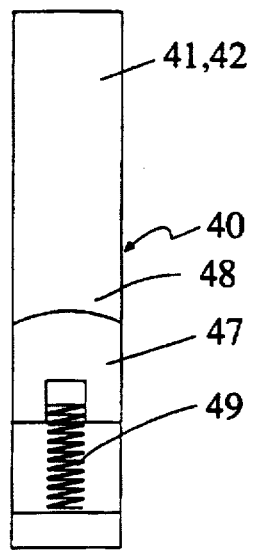

Referring to FIGS. 4 and 5 and 5a, part of the swashplate machine of FIGS. 1 to 3 is shown in more detail. The oscillatable member generally indicated by arrow 40 is bifurcated to provide two parts 41 and 42, one on either side of the swashplate 5 and the root junction between the bifurcations 41 and 42 is of radiused form as shown at 43. This is particularly desirable because the oscillatable member is very highly stressed and the radiused form distributes the load at this junction.

Mounted within the space between the bifurcations 41 and 42 is a sealing baffle 44 which has a surface 45 which corresponds to the surface 46 of the spherical member 8 forming part of the swashplate drive.

The lower end of member 40 is pivotably mounted in aperture 47 of spherical member 8 and the assembly is free to oscillate. A mounting block 47 having a top surface 48 complimentary to surface 46 is mounted in the base of the member 40. The block can be biased outwardly by a spring 49 as indicated.

Figure 6:
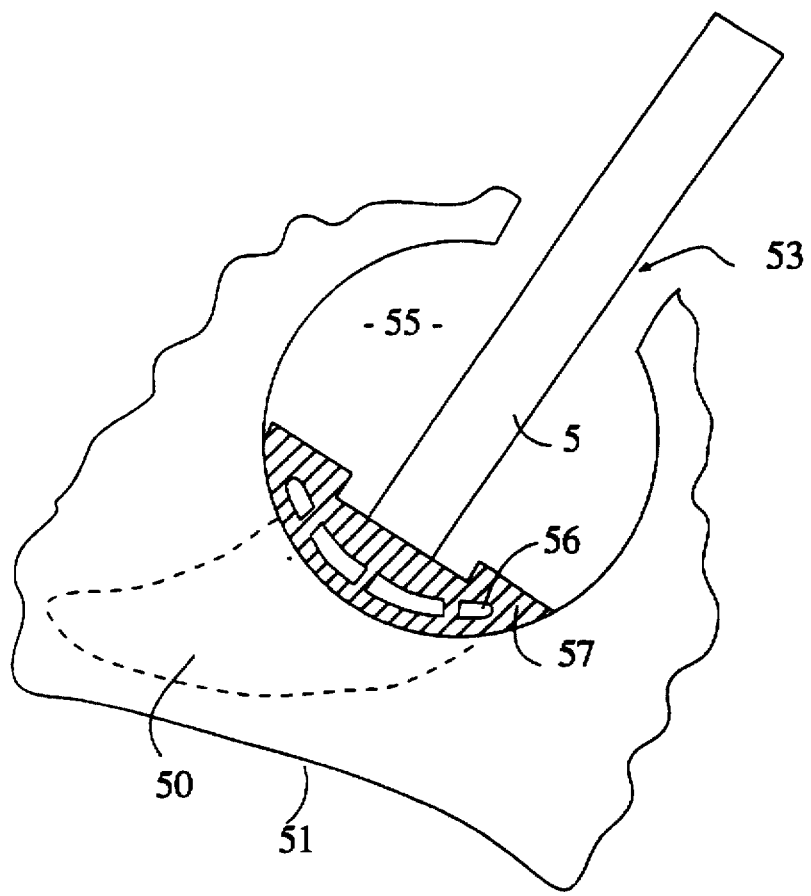

With respect to FIG. 6 of the drawings, an outlet 50 from the swashplate chamber can be covered by a valve member generally indicated by arrow 52 as illustrated. The valve stem 53 can be spring loaded as indicated or free or supported by support block 54 within spherical valve chamber 55. A curved foot 56 of the valve member can be covered by a mouldable resilient material which is keyed to the foot. Steps 57 at the periphery of the mouldable material protect the valve in the event of collision with upper regions of the housing 55.

If desired the casing may be split in a plane containing the axis of the shaft 4 or may be split in planes transverse to this axis if desired.

The construction of the sealing member and the oscillating member at least in the preferred form has the following advantages:

1. It overcomes the difficulty of machining the spherical surface at the bottom of the divider plate slot in the swashplate.
2. By connecting the two bifurcations 41 and 42 together any tendency for these two parts to jam between the half round socket and the baffle is overcome.
3. The spring loaded sealing member 24 maintains a very good fluid seal.
4. Machining generally is simplified.
5. The baffle/oscillatable member system can be readily duplicated in the diametrically opposite portion.
6. The mounting of the oscillatable member in the central ball assists in giving strength to the construction.

Aspects of the present invention have been described by way of example only and it should be appreciated that modifications and additions may be made thereto without departing from the scope thereof as defined in the appended claims.

What I claim is:

1. A swashplate machine comprising a casing having end assemblies, a pair of end cones each having opposed semi-spherical surfaces and defining with the casing a ball assembly and swashplate chamber, an axle journalled with respect to the casing supporting a ball assembly and a swashplate which occupy the swashplate chamber, a baffle fixed to the casing which intersects and divides the swashplate chamber, wherein at least one of said cones is slidably mounted in the casing on a guide, the arrangement being such that during operation of the machine limited axial movement of said at least one cone is possible whilst rotational movement of the cone is prevented by said guide.

2. A swashplate machine as claimed in claim 1 wherein said at least one end cone has sealing means between its outer surface and the casing.

3. A swashplate machine as claimed in claim 1 or claim 2 wherein the guide is provided by pins.

4. A swashplate machine as claimed in claim 3 wherein said pins are fixed to said at least one end cone and slide in an apertures in the adjacent end assembly.

5. A swashplate machine as claimed in any one of claims 1 to 4 wherein biasing means is provided between said at least one moveable end cone and its adjacent end assembly.

6. The machine as claimed in claim 1, wherein an oscillatable bifurcated pivot is provided between said ball assembly and said swashplate, said pivot having a longitudinal slot between the two bifurcations thereof connected to each other by a root mounted to said ball assembly, and said swashplate fitting in the slot of said pivot.

7. The machine as claimed in claim 1, wherein the axle has at least one passageway therein, said passageway being open to a bearing at one end and open externally of the casing at the other end, and a non-return valve provided in said passageway, the construction and arrangement being such that said non-return valve allows a lubricant provided in said passageway to pass through said passageway in a direction from the end open externally of said casing toward the end open to said bearing only.

\* \* \* \* \*